(12) United States Patent
Di Nallo et al.

(10) Patent No.: US 10,129,165 B2
(45) Date of Patent: Nov. 13, 2018

(54) ELECTRONICS DEVICES HAVING ANTENNA DIVERSITY CAPABILITIES

(71) Applicant: Apple Inc., Cupertino, CA (US)

(72) Inventors: Carlo Di Nallo, San Carlos, CA (US); Mattia Pascolini, San Francisco, CA (US); Jerzy S. Guterman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 15/445,853

(22) Filed: Feb. 28, 2017

(65) Prior Publication Data
US 2018/0248811 A1  Aug. 30, 2018

(51) Int. Cl.
| | | |
|---|---|---|
| *G01R 31/08* | (2006.01) |
| *H04L 12/875* | (2013.01) |
| *H04W 72/04* | (2009.01) |
| *H04L 1/18* | (2006.01) |
| *H04L 5/00* | (2006.01) |
| *H04B 7/0404* | (2017.01) |
| *H04W 84/12* | (2009.01) |
| *H04W 4/80* | (2018.01) |

(52) U.S. Cl.
CPC ......... *H04L 47/564* (2013.01); *H04B 7/0404* (2013.01); *H04L 1/1816* (2013.01); *H04L 5/006* (2013.01); *H04L 5/0055* (2013.01); *H04L 5/0087* (2013.01); *H04W 72/0446* (2013.01); *H04W 4/80* (2018.02); *H04W 84/12* (2013.01)

(58) Field of Classification Search
CPC .................................................... H04L 47/564
See application file for complete search history.

(56) References Cited

U.S. PATENT DOCUMENTS

| | | |
|---|---|---|
| 7,573,820 B2 | 8/2009 | Krishnaswamy et al. |
| 7,933,561 B2 | 4/2011 | Sanguinetti |
| 8,472,427 B1 * | 6/2013 | Wheeler ........... H04W 72/1215 370/348 |

(Continued)

OTHER PUBLICATIONS

Kim, Interference Mitigation in Wireless Communications, School of Electrical and Computer Engineering, Georgia Institute of Technology, Dec. 2005, 133 pages.

*Primary Examiner* — Gerald A Smarth
(74) *Attorney, Agent, or Firm* — Treyz Law Group, P.C.; Michael H. Lyons

(57) ABSTRACT

An electronic device may include first and second antennas and a Bluetooth transceiver. Control circuitry may perform Bluetooth antenna diversity operations by coupling the Bluetooth transceiver to a selected one of the first and second antennas at a given time. The Bluetooth transceiver may transmit a first Bluetooth data packet and may determine whether a scheduled response packet associated with the first packet has been received over the first antenna during a predetermined time period. In response to determining that the Bluetooth transceiver has failed to receive the scheduled response packet during the first predetermined time period, the Bluetooth transceiver may re-transmit the first packet using the second antenna. This may serve to reduce the error rate of the transmitted Bluetooth data over time relative to scenarios where a single antenna is used, without requiring resource-intensive sensor circuitry to actively monitor the performance of the antennas.

20 Claims, 6 Drawing Sheets

(56) References Cited

U.S. PATENT DOCUMENTS

| | | |
|---|---|---|
| 9,070,974 B2 | 6/2015 | Hu et al. |
| 9,768,825 B2 * | 9/2017 | Wang .................. H04B 7/0817 |
| 2002/0137472 A1 | 9/2002 | Quinn et al. |
| 2008/0019312 A1 * | 1/2008 | Venkatachalam ..... H04L 1/1812 370/330 |
| 2012/0039329 A1 * | 2/2012 | Sun ...................... H04B 1/1027 370/345 |
| 2013/0308561 A1 | 11/2013 | He et al. |
| 2016/0227569 A1 | 8/2016 | Wang et al. |

\* cited by examiner

ELECTRONICS DEVICES HAVING ANTENNA DIVERSITY CAPABILITIES

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to ensure that wireless communications circuitry in an electronic device will perform satisfactorily in all operating conditions. For example, the operating environment of an electronic device such as the presence or absence of an external object in the vicinity of an electronic device may affect antenna tuning and wireless performance. Unless care is taken, the wireless performance of an electronic device may not be satisfactory in certain operating environments.

It would therefore be desirable to be able to provide improved wireless circuitry for operating electronic devices in various operating environments.

SUMMARY

An electronic device may be provided with wireless circuitry and control circuitry. The wireless circuitry may include first and second antennas, Wireless Local Area Network (WLAN) transceiver circuitry (e.g., first and second WLAN transceivers), and a Wireless Personal Area Network (WPAN) transceiver such as a Bluetooth transceiver. A switch may be coupled between the first and second antennas and the Bluetooth transceiver. The control circuitry perform Bluetooth antenna diversity operations by controlling the switch to couple the Bluetooth transceiver to a selected one of the first and second antennas at a given time. The Bluetooth transceiver may perform Bluetooth communications during alternating transmit and receive time periods (e.g., as dictated by the Bluetooth protocol). The transmit and receive time periods may each include, for example, one or more consecutive 625 μs Bluetooth protocol timeslots.

The Bluetooth transceiver may obtain a sequence of Bluetooth data packets for transmission to external communications equipment such as a peripheral Bluetooth device. The Bluetooth transceiver may transmit a first Bluetooth data packet from the sequence over the first antenna during a first transmit period. The control circuitry may determine whether the Bluetooth transceiver has received an expected or scheduled response packet (e.g., an Acknowledge (ACK) packet corresponding to the first Bluetooth data packet) over the first antenna during a first receive period. The ACK packet may be generated by the external equipment in response to successfully receiving the transmitted first Bluetooth data packet, for example.

In response to determining that the Bluetooth transceiver has failed to receive the ACK packet or that the Bluetooth transceiver has received a non-acknowledge (NACK) packet signaling that the external equipment has not received correctly a scheduled transmission over the first antenna during the first receive period, the control circuitry may control the switch to couple the second antenna to the Bluetooth transceiver. The Bluetooth transceiver may subsequently re-transmit the first Bluetooth data packet using the second antenna during a second transmit period. In response to reception of the ACK packet during the first receive period, the Bluetooth transceiver may transmit the second Bluetooth data packet from the sequence over the first antenna during the second transmit period.

In scenarios where the second antenna re-transmits the first Bluetooth data packet during the second transmit period, the control circuitry may determine whether the second antenna has received the ACK packet during a second receive period. In response to determining that the second antenna has received the ACK packet during the second receive period, the second antenna may be used to transmit the second Bluetooth data packet during a third transmit period. If the second antenna fails to receive the ACK packet or receives a NACK packet during the second receive period, the number of re-transmit attempts for the first Bluetooth data packet may be compared to a threshold value. If the number of re-transmit attempts is less than the threshold value, the first antenna may be switched into use for re-transmitting the first Bluetooth data packet during the third transmit period. If the number of re-transmit attempts is greater than or equal to the threshold value, a selected one of the first and second antennas may be used to transmit the second Bluetooth data packet in the sequence during the third transmit period.

The first WLAN transceiver may transmit WLAN signals over the first antenna. The second WLAN transceiver may transmit WLAN signals over the second antenna. An additional switch may be used to couple a selected one of the Bluetooth transceiver and the second WLAN transceiver to the second antenna. The first and second WLAN transceivers, the additional switch, and the Bluetooth transceiver may be formed on a shared integrated circuit or chip. Performing Bluetooth antenna diversity operations in this way may, for example, allow a different antenna to be used for conveying Bluetooth signals in the event that the default antenna in the device is blocked by external objects (e.g., without requiring processing intensive sensor circuitry to actively monitor the performance of the antennas). This may serve to reduce the error rate of the Bluetooth data received at the external device over time relative to scenarios where a single antenna is used for performing Bluetooth communications.

BRIEF DESCRIPTION OF THE DRAWINGS

FIG. 7 is an illustrative timing diagram that shows how short range data packets may be transmitted and received by

DETAILED DESCRIPTION

Figure 1:
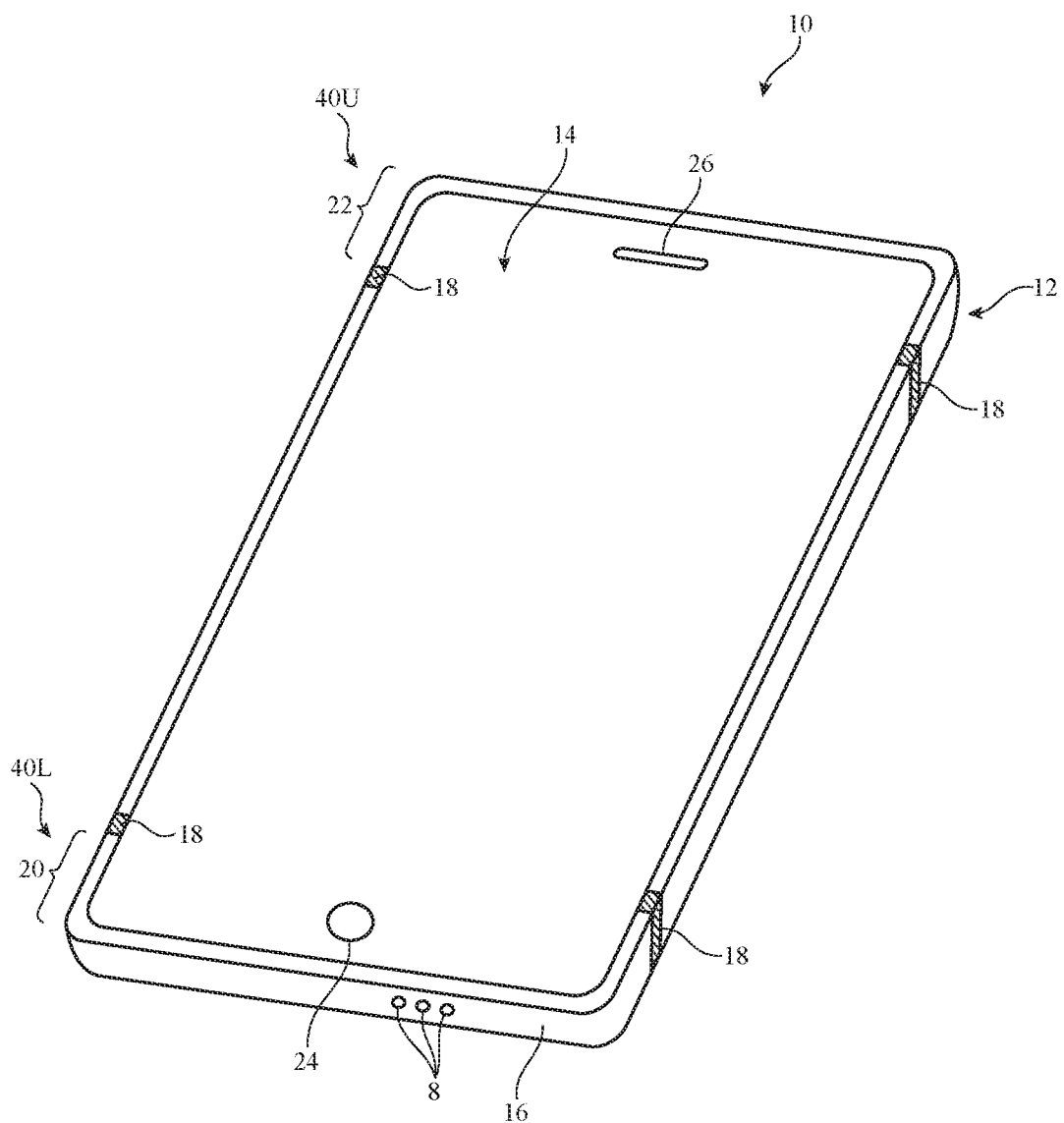
FIG. 1 is a perspective view of an illustrative electronic device with wireless communications circuitry in accordance with an embodiment.

Electronic devices such as electronic device 10 of FIG. 1 may contain wireless communications circuitry. The wireless communications circuitry may be used to support wireless communications in multiple wireless communications bands.

The wireless communications circuitry of device 10 may include a Global Position System (GPS) receiver that handles GPS satellite navigation system signals at 1575 MHz or a GLONASS receiver that handles GLONASS signals at 1609 MHz. Device 10 may also contain wireless communications circuitry that operates in communications bands such as cellular telephone bands and wireless circuitry that operates in communications bands such as the 2.4 GHz Bluetooth) band and the 2.4 GHz and 5 GHz WiFi, wireless local area network bands (sometimes referred to as IEEE 802.11 bands or wireless local area network communications bands). If desired, device 10 may also contain wireless communications circuitry for implementing near-field communications, light-based wireless communications, or other wireless communications (e.g., millimeter wave communications at 60 GHz or other extremely high frequencies, etc.).

The wireless communications circuitry may include one more antennas. The antennas of the wireless communications circuitry can include loop antennas, inverted-F antennas, strip antennas, planar inverted-F antennas, monopole antennas, dipole antennas, slot antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of an electronic device. The peripheral conductive structures may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane formed from conductive housing structures such as metal housing midplate structures and other internal device structures. Rear housing wall structures may be used in forming antenna structures such as an antenna ground.

Electronic device 10 may be a portable electronic device or other suitable electronic device. For example, electronic device 10 may be a laptop computer, a tablet computer, a somewhat smaller device such as a wrist-watch device, pendant device, headphone device (e.g., wireless earbuds or a wireless headset), earpiece device, or other wearable or miniature device, a handheld device such as a cellular telephone, a media player, or other small portable device. Device 10 may also be a set-top box, a desktop computer, a keyboard, mouse, joystick, trackpad device, remote control, microphone, computer workstation, docking device, a display into which a computer or other processing circuitry has been integrated, a display without an integrated computer, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a planar housing wall. The rear housing wall may have slots that pass entirely through the rear housing wall and that therefore separate housing wall portions (and/or sidewall portions) of housing 12 from each other. The slots may separate portions of the rear housing wall from portions of the sidewalls of housing 12 if desired. Housing 12 (e.g., the rear housing wall, sidewalls, etc.) may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Display 14 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 14 or the outermost layer of display 14 may be formed from a color filter layer, thin-film transistor layer, or other display layer. Buttons such as button 24 may pass through openings in the cover layer. The cover layer may also have other openings such as an opening for speaker port 26. Speaker port 26 may allow audio signals (sound) to be heard by a user of device 10 (e.g., while the user holds device 10 and speaker port 26 to their ear). Speaker port 26 may therefore sometimes be referred to herein as ear speaker port 26 or ear speaker 26.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may also, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, or a peripheral conductive housing member (as examples). Peripheral housing structures 16 may be formed from a metal such as stainless steel, aluminum, or other suitable materials. One, two, or more than two separate structures may be used in forming peripheral housing structures 16. If desired, holes such as holes 8 may be provided in peripheral structures 16 or in a rear surface of housing 12. Speakers within device 10 may transmit sound to the exterior of device 10 through holes 8 and/or through ear speaker 26. If desired, microphones may be placed adjacent to holes 8 or any other desired locations within device 10 to generate audio signals from sound received by device 10.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a rear housing wall of device 10 may be formed from a planar metal structure and portions of peripheral housing structures 16 on the sides of housing 12 may be formed as flat or curved vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions.

Housing 12 may include internal conductive structures such as metal frame members and a planar conductive housing member (sometimes referred to as a midplate) that spans the walls of housing 12 (i.e., a substantially rectangular sheet formed from one or more parts that is welded or otherwise connected between opposing sides of member 16). Device 10 may also include conductive structures such as printed circuit boards, components mounted on printed circuit boards, and other internal conductive structures. These conductive structures, which may be used in forming a ground plane in device 10, may be located in the center of housing 12.

In regions 22 and 20, openings may be formed within the conductive structures of device 10 (e.g., between peripheral conductive housing structures 16 and opposing conductive ground structures such as conductive housing midplate or rear housing wall structures, a printed circuit board, and conductive electrical components in display 14 and device 10). These openings, which may sometimes be referred to as gaps, may be filled with air, plastic, and other dielectrics and may be used in forming slot antenna resonating elements for one or more antennas in device 10.

Conductive housing structures and other conductive structures in device 10 such as a midplate, traces on a printed circuit board, display 14, and conductive electronic components may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22.

In general, device 10 may include any suitable number of antennas (e.g., one or more, two or more, three or more, four or more, etc.). In the example of FIG. 1, device 10 includes a first antenna 40L and a second antenna 40U formed on opposing sides of device 10. For example, antenna 40L may be formed within region 20 at the lower end of device 10 (e.g., the end of device 10 adjacent to microphone holes 8) and may therefore sometimes be referred to herein as lower antenna 40L. Similarly, antenna 40U may be formed within region 22 at the upper end of device 10 (e.g., the end of device 10 adjacent to ear speaker 26) and may therefore sometimes be referred to herein as upper antenna 40U. Antennas 40L and 40U may, if desired, be used separately to cover identical communications bands, overlapping communications bands, or separate communications bands. The antennas may be used to implement an antenna diversity scheme or a multiple-input-multiple-output (MIMO) antenna scheme. Antennas 40L and 40U may each include antenna resonating elements that are coupled to corresponding antenna signal feed terminals and antenna ground elements that are coupled to corresponding antenna ground feed terminals. Transmission line structures may be coupled between wireless transceiver circuitry in device 10 and the antenna feed terminals. The antenna resonating elements may be formed using portions of conductive housing wall 16 and/or using separate conductive elements located within regions 20 and 22.

The arrangement of FIG. 1 is merely illustrative. In general, the antennas in device 10 may be located at opposing first and second ends of an elongated device housing (e.g., at ends 20 and 22 of device 10 of FIG. 1), along one or more edges of device housing 12, in the center of device housing 12, in other suitable locations, or in one or more of these locations.

Portions of peripheral housing structures 16 may be provided with peripheral gap structures. For example, peripheral conductive housing structures 16 may be provided with one or more gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example, two peripheral conductive segments in peripheral housing structures 16 (e.g., in an arrangement with two of gaps 18), three peripheral conductive segments (e.g., in an arrangement with three of gaps 18), four peripheral conductive segments (e.g., in an arrangement with four gaps 18), etc.

The segments of peripheral conductive housing structures 16 that are formed in this way may form parts of antennas in device 10. For example, the segment of peripheral conductive housing structures 16 that is located between the two gaps 18 in region 20 may form some or all of an antenna resonating element for lower antenna 40L (e.g., one or more resonating element arms of an inverted-F antenna resonating element in scenarios where lower antenna 40L is an inverted-F antenna, a portion of a loop antenna resonating element in scenarios where lower antenna 40L is a loop antenna, a conductive portion that defines an edge of a slot antenna resonating element in scenarios where lower antenna 40L is a slot antenna, combinations of these, or any other desired antenna resonating element structures). Similarly, the segment of peripheral conductive housing structures 16 that is located between the two gaps 18 in region 22 may form some or all of an antenna resonating element for upper antenna 40U. This example is merely illustrative. If desired, antennas 40L and 40U may not include any portion of peripheral conductive housing structures 16 or segments of structures 16 may form part of an antenna ground plane for antennas 40L and 40U.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
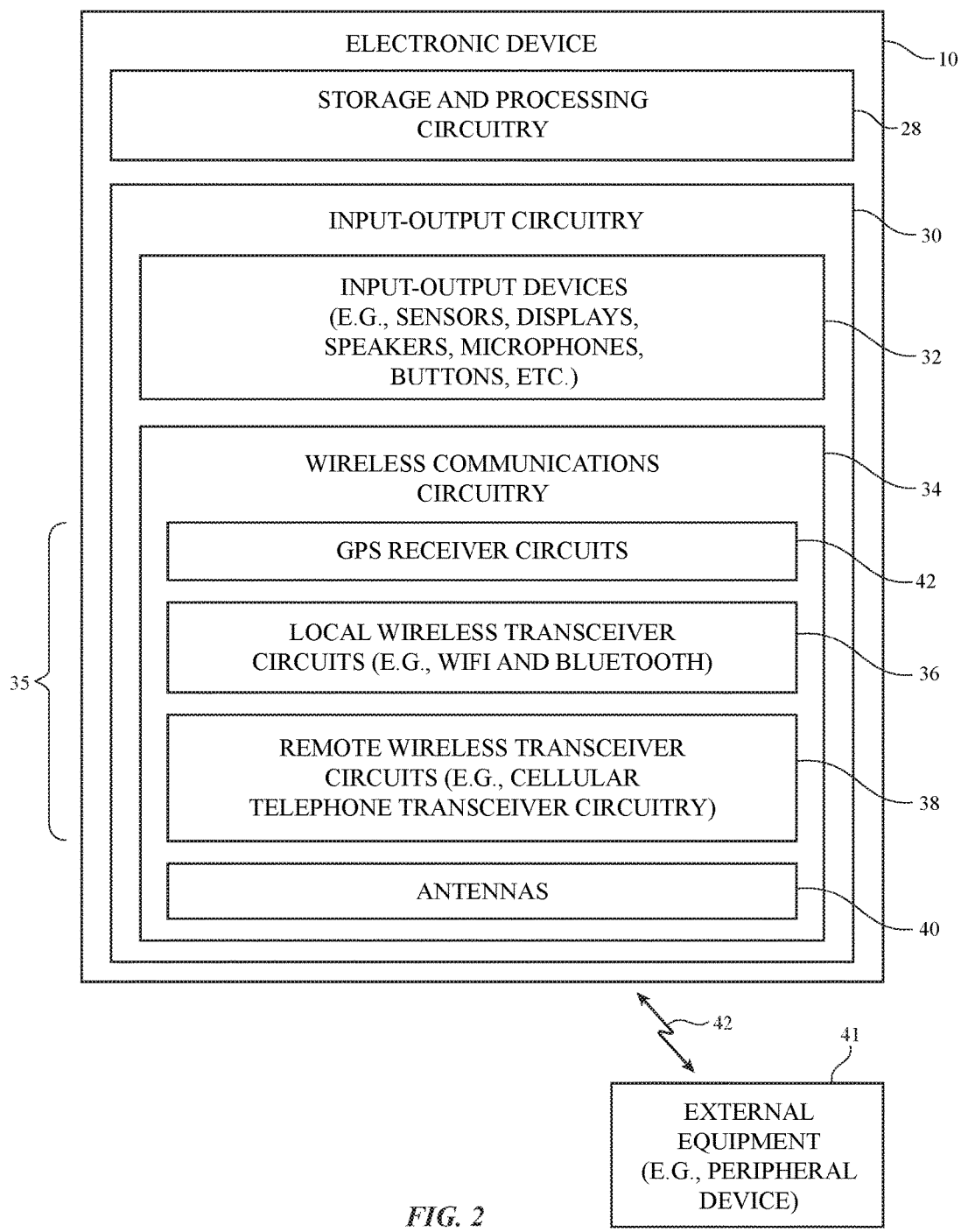
FIG. 2 is a schematic diagram of an illustrative electronic device with wireless communications circuitry for communicating with external equipment in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol or other Wireless Personal Area Network (WPAN) protocols, cellular telephone protocols, multiple-input and multiple-output (MIMO) protocols, antenna diversity protocols, etc. If desired, circuitry 28 may be used in tuning antennas, adjusting wireless transmit powers for transceivers in device 10 (e.g., transmit powers may be adjusted up and down in response to transmit power commands from wireless base stations while observing an established overall maximum allowed transmit power), and/or in otherwise controlling the wireless operation of device 10.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 35 for handling various radio-frequency communications bands. For example, circuitry 34 may include transceiver circuitry 36, 38, and 42. Short range (local) transceiver circuitry 36 may handle 2.4 GHz and 5 GHz bands for WiFi (IEEE 802.11) communications and may handle the 2.4 GHz Bluetooth communications band. Circuitry 34 may use cellular telephone transceiver circuitry 38 for handling wireless communications in frequency ranges such as a low communications band from 700 to 960 MHz, a low-midband from 960-1710 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include global positioning system (GPS) receiver equipment such as GPS receiver circuitry 42 for receiving GPS signals at 1575 MHz or for handling other satellite positioning data. In WiFi and Bluetooth links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, monopole antenna structures, dipole antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. Dedicated antennas may be used for transmitting and/or receiving signals in a particular band or, if desired, antennas 40 can be configured to receive signals for multiple communications bands.

Wireless communications circuitry 34 may use antennas 40 to communicate with one or more external devices such as external equipment 41 over wireless link 42. Wireless link 42 may, for example, be a short range (local) wireless link. Local wireless transceiver circuitry 36 may transmit radio-frequency signals to external equipment 41 over short range wireless link 42 and may receive radio-frequency signals from external equipment 41 over short range wireless link 42. In one illustrative scenario, short range wireless link 42 includes a WPAN path such as a Bluetooth path that is used to support communications between external equipment 41 and device 10. In this scenario, wireless signals that are conveyed over link 42 may include WPAN signals (e.g., Bluetooth signals) formatted according to the Bluetooth protocol. Bluetooth signals conveyed over link 42 may be transmitted in a Bluetooth frequency band at 2.4 GHz, for example.

External equipment 41 may have corresponding wireless communications circuitry. For example, external equipment 41 may be an accessory or peripheral device such as a wireless headset, wireless headphones, earpiece device, wireless microphone, wireless speakers, wireless monitor or display, a game controller, other equipment that receives and plays audio and/or video content, or other equipment that receives a user input and conveys the user input to device 10 over Bluetooth link 42. External equipment 41 may therefore sometimes be referred to herein as peripheral device 41, peripheral electronic device 41, accessory 41, or accessory device 41. These examples are merely illustrative. If desired, external equipment 41 may include a laptop computer, a tablet computer, a somewhat smaller device such as a wrist-watch device, pendant device, headphone device (e.g., wireless earbuds or a wireless headset), earpiece device, or other wearable or miniature device, a handheld device such as a cellular telephone, a media player, remote control, or other small portable device. External equipment 41 may also include a set-top box, a desktop computer, a keyboard, mouse, joystick, trackpad device, remote control, microphone, computer workstation, docking device, a display into which a computer or other processing circuitry has been integrated, a display without an integrated computer, or other suitable electronic equipment. In general, external equipment 41 may be any desired electronic device or system that wirelessly communicates with electronic device 10 over Bluetooth link 42.

If desired, device 10 may perform communications over other local wireless links in addition to Bluetooth link 42. For example, antennas 40 on device 10 may also establish a local wireless links such as a WiFi link. Because WiFi links are typically used to establish data links with local area networks, links such as WiFi links are sometimes referred to as WLAN links. WLAN links may operate at 2.4 GHz or 5.6 GHz (as examples), whereas Bluetooth link 42 operates at 2.4 GHz. The frequencies that are used to support these local links in device 10 may depend on the country in which device 10 is being deployed (e.g., to comply with local regulations), the available hardware of the transceiver circuitry 36 or other equipment with which device 10 is connecting, and other factors.

If desired, device 10 may communicate using both the popular 2.4 GHz WiFi bands (802.11(b) and/or 802.11(g)) and the 2.4 GHz Bluetooth band using the same antenna 40. In this type of configuration, the antenna is designed to operate at a frequency of 2.4 GHz, so the antenna is suitable for use with the 2.4 GHz radio-frequency signals that are used in connection with both the WiFi and Bluetooth communications protocols (e.g., the antenna may have a resonating length, perimeter, or volume such that the antenna has satisfactory antenna efficiency at 2.4 GHz). Circuitry 36 may include switching circuits and other suitable circuitry that allows WiFi and Bluetooth signals to both be conveyed over a single antenna 40.

In typical scenarios, wireless communications circuitry 34 conveys Bluetooth signals using only a single antenna 40 (e.g., circuitry 34 uses the same antenna 40 whenever Bluetooth signals are conveyed). However, in practice, the radio-frequency performance of the antenna that is used to convey Bluetooth signals may become degraded (e.g., due to the presence of external objects such as a user's body or other objects). This may degrade the quality of Bluetooth link 42, may cause communications errors, may cause link 42 to be dropped, etc.

To help mitigate these risks, wireless communications circuitry 34 may implement a short range (local) antenna diversity scheme such as a Bluetooth antenna diversity scheme in which multiple antennas 40 are used to convey Bluetooth signals with external equipment 41. For example, an upper antenna 40U located in upper device region 22 of FIG. 1 and a lower antenna 40L located in lower device region 20 may both be used to convey Bluetooth signals under a Bluetooth antenna diversity scheme.

Figure 3:
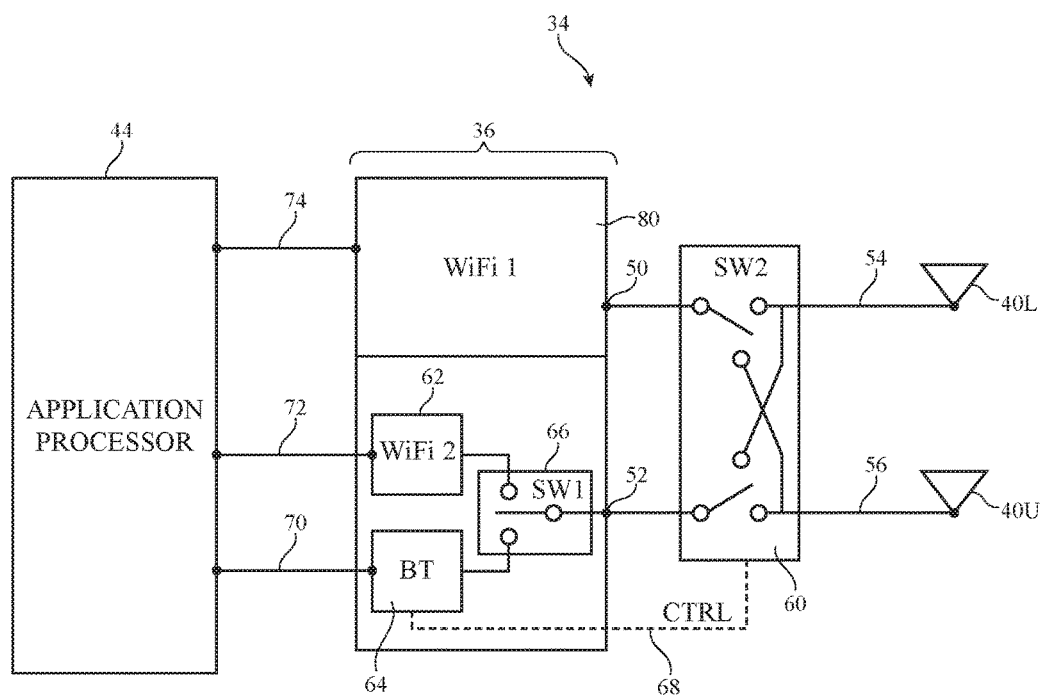
FIG. 3 is a circuit diagram of illustrative wireless communications circuitry having short range antenna diversity capabilities in accordance with an embodiment.

FIG. 3 is a circuit diagram showing how wireless communications circuitry 34 may include circuitry for performing Bluetooth antenna diversity operations using two antennas 40U and 40L. As shown in FIG. 3, wireless communications circuitry 34 may include upper antenna 40U, lower antenna 40L, and local wireless transceiver circuitry 36. Upper antenna 40U may be located within device region 22 whereas lower antenna 40L is located within device region 20 (FIG. 1). This is merely illustrative and, in general, antennas 40U and 40L may be formed at any desired locations within device 10.

In practice, one of antennas 40U and 40L may typically be favored over the other for conveying Bluetooth signals over Bluetooth link 42. For example, it may be preferable more often to use upper antenna 40U rather than lower antenna 40L due to considerations such as superior efficiency, superior band coverage, superior radiation patterns, etc. As another example, upper antenna 40U may be statistically more likely to be located closer to or facing external equipment 41 during normal operations of device 10 by a user (e.g., while device 10 is being held in the user's hand, while device 10 is placed on a surface, while device 10 is located within the user's pocket, etc.). In other words, upper antenna 40U may be statistically more likely to support a higher quality Bluetooth link with external equipment 41 than lower antenna 40L at any given moment. Upper antenna 40U may therefore sometimes be referred to herein as the primary antenna, primary Bluetooth antenna, default antenna, or default Bluetooth antenna for device 10, whereas lower antenna 40L may sometimes be referred to herein as the secondary antenna or secondary Bluetooth antenna for device 10. This example is merely illustrative. In general, any desired antenna 40 in device 10 may be the primary antenna (e.g., an antenna physically located closest to transceiver 36, an antenna having the highest average efficiency, etc.).

Device 10 may attempt to use the primary antenna as much as possible for conveying Bluetooth signals but may switch to using the secondary antenna for conveying Bluetooth signals when operation of the primary antenna becomes disrupted. Antenna operation can be disrupted when the antenna is blocked by an external object such as a user's hand, when device 10 is placed near objects that interfere with proper antenna operation, or due to other factors (e.g., device orientation relative to its surroundings, etc.).

Antenna diversity systems in which device 10 has a primary antenna and a secondary antenna are sometimes described herein as an example. This is, however, merely illustrative. Device 10 may use an antenna diversity arrangement that is based on three or more antennas or may use other types of antenna configurations.

Local wireless transceiver circuitry 36 may include multiple radio-frequency transceivers. As shown in FIG. 3, local wireless transceiver circuitry 36 may include a first WLAN transceiver ("WIFI1") 80, a second WLAN transceiver ("WIFI2") 62, and a Bluetooth transceiver ("BT") 64. WLAN transceivers 80 and 62 may handle signals formatted according to a WLAN (e.g., WiFi) protocol (sometimes referred to herein as WLAN signals or WiFi signals). Bluetooth transceiver 64 may handle Bluetooth signals formatted according to the Bluetooth protocol.

In one suitable arrangement, each of the components of local wireless communications transceiver circuitry 36 (e.g., WLAN transceiver 80, WLAN transceiver 62, and Bluetooth transceiver 64) are formed on a single shared integrated circuit, chip, or substrate (e.g., a single shared printed circuit board substrate, a single application specific integrated circuit, etc.). Local wireless communications transceiver circuitry 36 may therefore sometimes be referred to herein as radio-frequency module 36. WLAN/Bluetooth module 36, local wireless communications chip 36, or local wireless communications module 36. This example is merely illustrative. If desired, transceivers 80, 62, and/or 64 may be formed on one or more different integrated circuits, chips, or substrates. Some or all of transceiver circuits 42 and 38 (FIG. 2) may be formed on the same integrated circuit, chip, or substrate as module 36 if desired.

Radio-frequency module 36 may include a first port 50 coupled to the secondary antenna (e.g., antenna 40L) via radio-frequency transmission line 54. Module 36 may include a second port 52 coupled to the primary antenna (e.g., upper antenna 40U) via radio-frequency transmission line 56. Lines 54 and 56 may include coaxial cable structures, stripline transmission line structures, and/or a microstrip transmission line structures (as examples). Ports 52 and 50 may each include any desired radio-frequency connector structures such as conductive pins, contact pads, conductive sockets, conductive spring structures, conductive screws, conductive clips, solder balls, micro bumps, conductive adhesive or tape, welds, coaxial connectors, microcoaxial connectors, U.FL connectors, or other conductive structures.

WLAN transceiver circuitry 80 may be coupled to applications processor circuitry 44 over path 74. WLAN transceiver circuitry 62 may be coupled to applications processor 44 over path 72. Bluetooth transceiver circuitry 64 may be coupled to applications processor 44 over path 70. Paths 72, 74, and 70 may each be implemented using a corresponding serial data path (e.g., a universal asynchronous receiver/transmit (UART) path) or using any other desired data paths. Applications processor 44 may include a portion of storage and processing circuitry 28 or other processing circuitry on device 10. Applications processor 44 may be formed on a different integrated circuit, chip, or substrate than radio-frequency module 36, as an example.

Applications processor 44 may generate data for transmission to external equipment 41 and may pass the generated data to WLAN transceiver circuitry 80 via path 74, to WLAN transceiver circuitry 62 via path 72, and/or to Bluetooth transceiver circuitry 64 via path 70 (e.g., based on which communications protocol is to be used). Similarly, applications processor 44 may receive data from WLAN transceiver 80 over path 74, may receive data from WLAN transceiver 62 over path 72, and/or may receive data from Bluetooth transceiver 64 over path 70.

Module 36 may, if desired, include baseband circuitry (not shown) that formats transmit data received from applications processor 44 according to the desired communications protocol (e.g., at a baseband frequency). In another suitable arrangement, some or all of the baseband circuitry may be formed as a part of applications processor 44. WLAN transceivers 80 and 62 may receive baseband data that has been formatted according to a WLAN protocol from the baseband processor circuitry. WLAN transceivers 80 and 62 may each include mixer circuitry that generates radio-frequency WLAN signals by up-converting the baseband data to a radio-frequency (e.g., a 2.4 GHz WLAN frequency). Mixer circuitry in transceivers 80 and 62 may also down-convert radio-frequency signals received by antennas 40 to baseband frequencies. If desired, WLAN transceivers 80 and 62 may each include converter circuitry (e.g., analog-to-digital converter circuitry and/or digital-to-analog converter circuitry), amplifier circuitry (e.g., power amplifier and/or low noise amplifier circuitry), switching circuitry, filtering circuitry, phase shifting circuitry, or any other desired circuitry for handling radio-frequency signals.

WLAN transceiver circuitry 80 may transmit radio-frequency WLAN signals to antenna 40L over port 50 and radio-frequency transmission line 54. Antenna 40L may subsequently transmit the radio-frequency WLAN signals to external equipment 41. Similarly, antenna 40L may receive radio-frequency WLAN signals from external equipment 41 and may convey the received signals to WLAN transceiver circuitry 80 via port 50 and transmission line 54.

Bluetooth transceiver 64 may receive baseband data that has been formatted according to the Bluetooth protocol from the baseband processor circuitry. Bluetooth transceiver circuitry 64 may include mixer circuitry that generates radio-frequency Bluetooth signals by up-converting the baseband data to a radio-frequency (e.g., a 2.4 GHz Bluetooth frequency). Mixer circuitry in transceiver 64 may also down-convert radio-frequency signals received by antennas 40 to baseband frequencies. If desired, Bluetooth transceiver 64 may include converter circuitry (e.g., analog-to-digital converter circuitry and/or digital-to-analog converter circuitry), amplifier circuitry (e.g., power amplifier and/or low noise amplifier circuitry), switching circuitry, filtering circuitry, phase shifting circuitry, or any other desired circuitry for handling radio-frequency signals.

Bluetooth transceiver 64 may transmit the radio-frequency Bluetooth signals (sometimes referred to herein as radio-frequency Bluetooth data, Bluetooth data, or Bluetooth signals) over port 52 of module 36. A first radio-frequency switch 66 ("SW1") on module 36 may be coupled between WLAN transceiver 62, Bluetooth transceiver 64, and port 52 (e.g., switch 66 may have a first switch port coupled to WLAN transceiver 62, a second switch port coupled to Bluetooth transceiver 64, and a third switch port coupled to port 52). The switch ports may sometimes be referred to herein as switch terminals. Switch 66 may selectively connect one of transceivers 62 and 64 to module port 52 at a given time. Switch 66 may include, for example, a single-pole double-throw (SPDT) switch or any other desired switching circuitry. Switch 66 may have a first state in which WLAN transceiver 62 is coupled to port 52 and Bluetooth transceiver 64 is decoupled from port 52 (e.g., a first state in which the first switch port is shorted to the third switch port). Switch 66 may have a second state in which WLAN transceiver 62 is decoupled from port 52 and Bluetooth transceiver 64 is coupled to port 52 (e.g., a second state in which the second switch port is shorted to the third switch port).

Control circuitry on module 36 and/or storage and processing circuitry 28 (FIG. 1) may control the state of switch 66 using a corresponding control path (not shown). When it is desired to convey WLAN data over upper antenna 40U, switch 66 is placed in the first state to couple port 52 to WLAN transceiver 62, so that data can be transmitted from WLAN transceiver 62 to antenna 40U or from antenna 40U to WLAN transceiver 62 over path 56. Switch 66 is placed in the second state to couple port 52 to Bluetooth transceiver 64 when it is desired to convey Bluetooth signals over antennas 40. Control paths between WLAN transceiver 80 and WLAN transceiver 62 (e.g., intra-chip control paths) may allow WLAN transceivers 80 and 62 to coordinate WLAN communications over antennas 40L and 40U, if desired.

A second radio-frequency switch 60 ("SW2") may be interposed on transmission line 56 and 54. Switch 60 may have a first switch port coupled to upper antenna 40U, a second switch port coupled to port 52, a third switch port coupled to lower antenna 40L, and a fourth switch port coupled to port 50. Switch 60 may selectively couple port 52 to antenna 40L and port 50 to 40U or may alternatively couple port 52 to antenna 40U and port 50 to antenna 40L. Switch 60 may include, for example, a double-pole double-throw (DPDT) switch or any other desired switching circuitry. Switch 60 may be formed external to module 36 (e.g., switch 60 may not be formed on the integrated circuit, substrate, or chip on which circuitry 36 is formed), as an example. Switch 60 may have a first state in which port 52 is coupled to upper antenna 40U and port 50 is coupled to lower antenna 40L. Switch 60 may have a second state in which port 52 is coupled to lower antenna 40L and port 50 is coupled to upper antenna 40U. Switch 60 may be toggled to selectively route Bluetooth signals transmitted at port 52 to a given one of antennas 40U and 40L or to selectively route Bluetooth signals from a given one of antennas 40U and 40L to port 52 while performing Bluetooth antenna diversity operations.

Control circuitry on Bluetooth transceiver circuitry 64 may control the state of switch 60 using Bluetooth antenna diversity control signals CTRL provided over control path 68. When it is desired to convey Bluetooth data over upper antenna 40U, switch 66 is placed in the second state to couple port 52 to Bluetooth transceiver 64 and switch 60 is placed in the first state, so that Bluetooth signals can be transmitted from Bluetooth transceiver 64 to upper antenna 40U or from antenna 40U to Bluetooth transceiver 64 over port 52 and path 56. When it is desired to convey Bluetooth data over lower antenna 40L, switch 66 is placed in the second state and switch 60 is placed in the second state, so that Bluetooth signals can be transmitted from Bluetooth transceiver 64 to lower antenna 40L or from antenna 40L to Bluetooth transceiver 64 over port 52. Switch 60 may be placed in the first state to couple port 52 to upper antenna 40U whenever WLAN transceiver 62 is in use (e.g., whenever switch 66 is placed in the first state to couple WLAN transceiver 62 to port 52).

When Bluetooth transceiver 64 is coupled to upper antenna 40U, WLAN communications may be simultaneously maintained over lower antenna 40L if desired (e.g., WLAN transceiver 80 may continue to transmit and receive WLAN signals over antenna 40L and path 54 while Bluetooth transceiver 64 conveys Bluetooth signals using upper antenna 40U). When Bluetooth transceiver 64 is coupled to lower antenna 40L, WLAN communications may be temporarily halted. In another suitable arrangement. Bluetooth communications may be performed by Bluetooth transceiver 64 on a sub band using lower antenna 40L while lower antenna 40L also conveys WLAN signals. If desired, WLAN communications may be time multiplexed with Bluetooth communications using lower antenna 40L (e.g., WLAN signals may be conveyed between antenna 40L and WLAN transceiver 80 during time periods in which Bluetooth signals are not actively being transmitted or received over lower antenna 40L).

By toggling switch 60. Bluetooth transceiver 64 may change which antenna is being used for performing wireless communications over Bluetooth link 42 in real time. This may allow an antenna that exhibits greater radio-frequency performance to be used for Bluetooth signal transmission or reception whenever the other antenna exhibits deteriorated radio-frequency performance (e.g., due to being blocked by an external object).

The example of FIG. 3 is merely illustrative. In general, any desired radio-frequency circuitry may be interposed on conductive paths 54, 56 (e.g., radio-frequency matching circuitry, filtering circuitry, amplifier circuitry, switching circuitry, duplexer circuitry, diplexer circuitry, passive components, active components, etc.). More than two antennas may be used if desired. More than two WLAN transceivers may be used if desired.

The example sometimes described herein in which link 42 is a Bluetooth link and transceiver 64 is a Bluetooth transceiver is merely illustrative. In general, link 42 may be any desired Wireless Personal Area Network (WPAN) link (e.g., a wireless link operated using an IEEE 802.15 protocol) and transceiver 64 may be any desired WPAN transceiver (e.g., a transceiver that performs transmission and/or reception according to an IEEE 802.15 protocol). Transceiver 64 may therefore sometimes be referred to herein as WPAN transceiver 64. Packets conveyed over link 42 may sometimes be referred to herein as WPAN packets (e.g., Bluetooth packets) or WPAN data packets. The WPAN link may support wireless communications over a personal area network (e.g., a wireless network governed by an IEEE 802.15 WPAN protocol such as a network of local wirelessly connected devices within a user's vicinity or workspace or on a user's body). Two devices in the WPAN network may communicate over wireless link 42 as if they were plugged in using a physical wire, as an example. This may involve protocol that prevents other nearby devices from interfering with the two linked devices. As an example, data may be symmetrically conveyed over link 42 such that wireless WPAN data packets (e.g., audio packets) conveyed from a first device to a second device are each acknowledged by a corresponding response packet sent from the second device to the first device. WPAN protocols that may be supported by transceiver 64 for communicating over link 42 may include, but are not limited to, Bluetooth protocols (e.g., a Bluetooth 4.0, Bluetooth 4.1, Bluetooth 4.2, Bluetooth 5, or other Bluetooth protocols), Z-Wave® protocols, ZigBee® protocols, Wireless USB protocols. Body Area Network protocols, Infrared Data Association®, protocols, or other IEEE 802.15 protocols, as examples.

In some scenarios, sensor circuitry or other circuitry on device 10 may actively monitor the radio-frequency performance of each antenna 40L and 40U to determine which antenna to use for Bluetooth communications at a given time. If the sensor circuitry (e.g., a capacitive proximity sensor, impedance measurement circuitry, an ambient light sensor, etc.) determines that antenna 40U will likely exhibit superior radio-frequency performance relative to antenna 40L (e.g., if the sensor circuitry determines that an external object is blocking antenna 40L), antenna 40U may be switched into use for handling Bluetooth communications. Likewise, if the sensor circuitry determines that antenna 40L will exhibit superior radio-frequency performance relative to antenna 40U, antenna 40L may be switched into use for handling Bluetooth communications. However, performing Bluetooth diversity operations in this manner may consume excessive time and result in one or more packets of the Bluetooth data stream being lost or dropped. This may result in excessively high data error rates for the Bluetooth data received at external equipment 41. If desired, device 10 may perform Bluetooth antenna diversity operations without using sensor circuitry to actively monitor the radio-frequency performance of each antenna.

Figure 4:
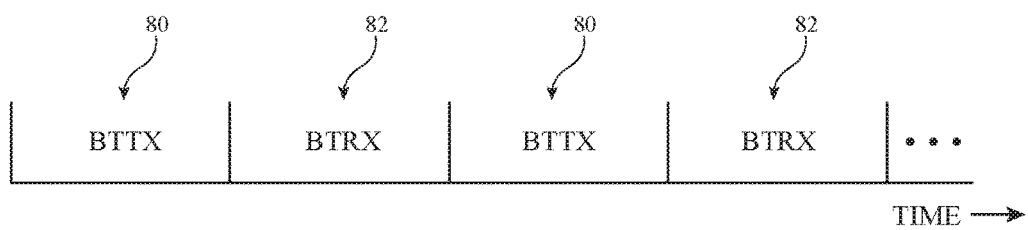
FIGS. 4 and 5 are timing diagrams that illustrate wireless activity associated with using communications circuitry such as illustrative wireless communications circuitry of the type shown in FIG. 3 in accordance with an embodiment.

FIG. 4 is a timing diagram that illustrates how Bluetooth transceiver 64 may alternate between transmitting and receiving Bluetooth signals over time. As shown in FIG. 4, time is plotted on the horizontal axis. During Bluetooth operations, Bluetooth transceiver 64 alternates between transmitting data and receiving data according to a schedule that is determined by the Bluetooth protocol specifications. Bluetooth transceiver 64 transmits Bluetooth signals during transmit periods (timeslots) 80 ("BT TX"). Bluetooth transceiver 64 receives Bluetooth signals during receive periods (timeslots) 82 ("BT RX"). If desired, each transmit period 80 and each receive period 82 may include one, two, three, four, five, or more than five consecutive 625 μs Bluetooth protocol timeslots, as examples (e.g., each time period 80 and 82 may be greater than or equal to 625 μs in duration).

Bluetooth data that is transmitted or received using the Bluetooth protocol is formatted into a sequence (series) of Bluetooth data packets. For example, applications processor 44 may generate data for transmission to Bluetooth transceiver 64 (e.g., audio data or video data to be played on a peripheral device 41, control data for controlling the operation of device 41, etc.). Baseband circuitry may format (encode) the data received from applications processor 44 into data packets according to the Bluetooth protocol. Transceiver 64 may generate the sequence of Bluetooth data packets (e.g., the radio-frequency Bluetooth signals) by up-converting the data packets to a Bluetooth frequency. The Bluetooth frequency may be, for example, a frequency in one of the 79, 1 MHz bandwidth, designated Bluetooth frequency channels or in one of the 40, 2 MHz bandwidth, designated Bluetooth low energy channels. Transceiver 64 may perform frequency hopping operations in which each Bluetooth data packet in the sequence is generated in a respective one of the designated Bluetooth or Bluetooth low energy channels (e.g., the first Bluetooth data packet in the series may be generated in Bluetooth channel 4, the second Bluetooth data packet in the series may be generated in Bluetooth channel 50, the third Bluetooth data packet in the series may be generated in Bluetooth channel 33, etc.). The particular channel that is used for each packet may be determined by transceiver 64 based on the standards of the Bluetooth protocol, for example.

Transceiver 64 may schedule each Bluetooth data packet in the sequence for transmission during a corresponding transmit period 80 (e.g., each Bluetooth data packet in the sequence may be transmitted during the one to five 625 μs Bluetooth protocol timeslots associated with the corresponding transmit period 80). The Bluetooth protocol dictates that each transmit period 80 is followed by a corresponding receive period 82 during which transceiver 64 waits to receive a scheduled Bluetooth data packet from external equipment 41 (e.g., without transmitting any Bluetooth data).

In order to ensure that each of the Bluetooth data packets are being successfully received at external equipment 41, external equipment 41 generates a respective scheduled Bluetooth data packet in response to successfully receiving each Bluetooth data packet that is transmitted by transceiver 64. The scheduled Bluetooth data packets generated by external equipment 41 may be Bluetooth response or acknowledge (ACK) packets (sometimes referred to as acknowledgement packets), as examples. Each ACK packet generated by external equipment 41 thereby corresponds to a respective one of the Bluetooth data packets transmitted by device 10 (e.g., equipment 41 may generate a first ACK packet in response to receiving the first Bluetooth data packet transmitted by device 10, may generate a second ACK packet in response to receiving the second Bluetooth data packet transmitted by device 10, etc.). Each ACK packet may, for example, have a header field that includes information that identifies the packet as an ACK packet and/or that identifies the particular received data packet that the ACK packet is acknowledging successful receipt of by external equipment 41.

If desired, external equipment 41 may signal to transceiver 64 over Bluetooth link 42 that a scheduled Bluetooth data packet has not been received or decoded correctly during a predetermined time slot using a non-acknowledge (NACK) packet. External equipment 41 may transmit the NACK packet to device 10 in response to failing to receive or correctly decode the scheduled Bluetooth data packet. The NACK packet may, for example, have a header field that includes information identifying the NACK packet as a NACK packet and/or that identifies the corresponding scheduled Bluetooth data packet that has not been successfully received at equipment 41. Transceiver 64 may identify that each Bluetooth data packet transmitted by device 10 has been successfully received by external equipment 41 when a corresponding ACK packet has been received from external equipment 41. Once transceiver 64 has received an ACK packet identifying that a corresponding transmitted Bluetooth data packet has been successfully received by external equipment 41, transceiver 64 may transmit the next Bluetooth data packet in the sequence of Bluetooth data packets to external equipment 41.

In a scenario in which only a single antenna is used for Bluetooth communications, if an ACK packet has not been received or a NACK packet has been received within a scheduled receive period 82 (e.g., within the receive period 82 immediately following the transmit period 80 in which the corresponding Bluetooth data packet was transmitted by device 10), transceiver 64 re-transmits the corresponding Bluetooth data packet using the same antenna 40. After a threshold number of un-acknowledged re-transmit attempts (e.g., two un-acknowledged re-transmit attempts), the corresponding Bluetooth data packet may be considered to have been dropped or lost and transceiver 64 proceeds to transmit the next Bluetooth data packet in the sequence.

Consider an example of this scenario in which transceiver 64 transmits a first Bluetooth data packet in the sequence using a given antenna and during a first scheduled transmit period 80 (FIG. 4). Transceiver 64 may wait for the duration of the first scheduled receive period 82 to receive the ACK packet corresponding to the first Bluetooth data packet from external equipment 41. If transceiver 64 receives the ACK packet, transceiver 64 transmits the second Bluetooth data packet in the sequence during the second scheduled transmit period 80 using the same antenna. If transceiver 64 does not receive the ACK packet, transceiver 64 re-transmits the first Bluetooth data packet during the scheduled second transmit period 80 using the same antenna. Transceiver 64 then waits for the duration of the second scheduled receive period 82 to receive the ACK packet. If transceiver 64 receives the ACK packet, transceiver 64 transmits the second Bluetooth data packet in the sequence during the scheduled third transmit period 80 using the same antenna. If transceiver 64 does not receive the ACK packet, transceiver 64 performs one more re-transmit attempt for the first Bluetooth data packet over the same antenna. If the ACK packet is still not received after the second re-transmission attempt, transceiver 64 then moves on to the second Bluetooth data packet in the sequence for transmission. Performing Bluetooth communications in this way using a single antenna can result in one or more packets in the sequence being dropped (e.g., because that single antenna is being blocked by an external object), thereby introducing undesirable errors in the data that is received at external equipment 41.

Figure 5:
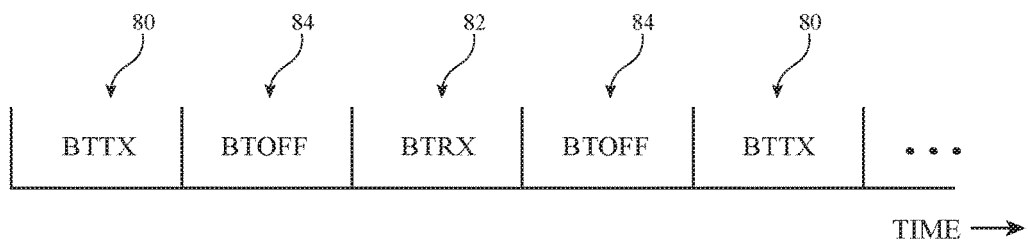

The example of FIG. 4 is merely illustrative. If desired, other time periods may be interposed between scheduled transmit periods 80 and receive periods 82. FIG. 5 is a timing diagram that shows how additional time periods may be interposed between periods 80 and 82. As shown in FIG. 5, periods 84 ("BTOFF") may be interposed between transmit time periods 80 and receive time periods 82. Periods 84 may be time periods during which no Bluetooth data packets are transmitted or received by transceiver 64. As an example, the timing diagram of FIG. 5 may correspond to how signals are conveyed over lower antenna 40L. In this scenario, WLAN signals handled by WLAN transceiver 80 may be conveyed using lower antenna 40L during time periods 84 (e.g., WLAN signals may be time-multiplexed with the Bluetooth signals on a given antenna if desired). This example is merely illustrative and, in general, any desired timing that accommodates or conforms to the Bluetooth protocol may be used.

If desired, Bluetooth transceiver 64 may perform Bluetooth antenna diversity operations in order to help mitigate the risk of dropping packets and introducing errors over Bluetooth link 42. The Bluetooth antenna diversity operations may involve switching between different antennas 40 while transmitting a sequence of Bluetooth data packets. Bluetooth transceiver 64 may select which antenna 40 (e.g., a selected one of antennas 40L and 40U) to use at a given time based on scheduling associated with the Bluetooth protocol (e.g., without relying on sensors or other processing-intensive circuitry).

Figure 6:
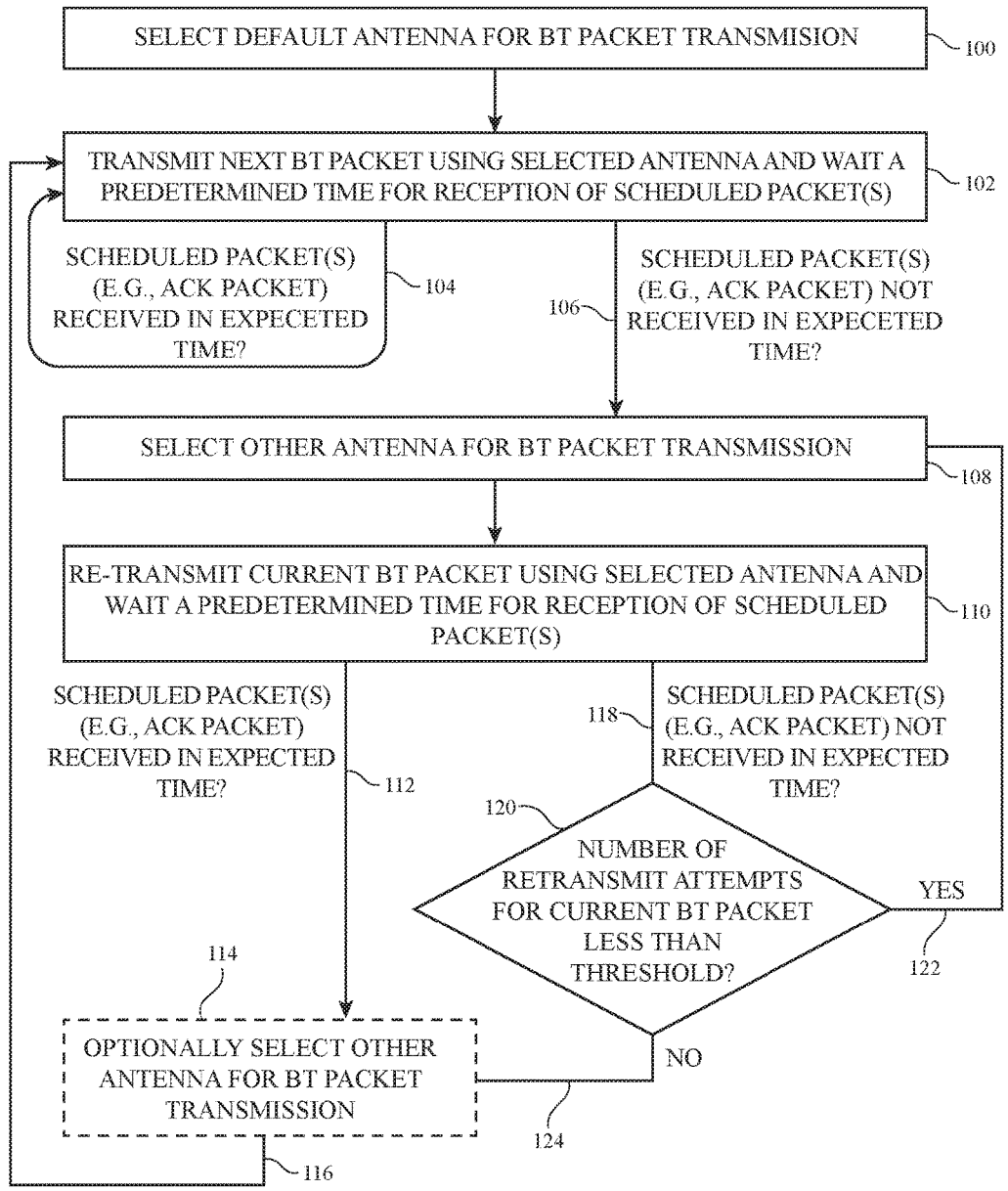
FIG. 6 is a flow chart of illustrative steps involved in performing short range antenna diversity operations using wireless communications circuitry in accordance with an embodiment.

FIG. 6 is a flow chart of illustrative steps that may be performed by Bluetooth circuitry 64 and/or processing circuitry 28 in performing Bluetooth antenna diversity operations based on the scheduling associated with the Bluetooth protocol.

At step 100, Bluetooth circuitry 64 may select a default antenna for transmitting Bluetooth data packets to external equipment 41. Bluetooth circuitry 64 may provide control signals CTRL over control path 68 to place switch 60 in a state that couples the selected antenna to port 52. In the example of FIG. 3, upper antenna 40U is the default antenna and circuitry 64 may control switch 60 to couple upper antenna 40U to port 52. Upper antenna 40U may be selected as the default (primary) antenna because antenna 40U is statistically more likely to have a high link quality with external equipment 41 (e.g., because upper antenna 40U is more likely to be facing external equipment 41 at a given time than lower antenna 40L), because antenna 40U is located closer to module 36 in device 10 than lower antenna 40L (e.g., so less loss is incurred in conveying signals to antenna 40U than to antenna 40L from module 36), or because upper antenna 40U has superior radiation characteristics than lower antenna 40L, as examples. In general, any desired antenna 40 may be selected as the default antenna.

Bluetooth transceiver 64 may receive a stream of data packets from baseband circuitry for transmission over Bluetooth link 42. The stream of data packets may, for example, include a stream of audio packets, video packets, or any other desired data. Transceiver 64 may convert the stream of data packets into a sequence of Bluetooth data packets according to the Bluetooth protocol. The sequence of Bluetooth data packets may be arranged in a chronological order (e.g., the sequence may begin with a first Bluetooth data packet and end in a last Bluetooth data packet).

At step 102, transceiver circuitry 64 may transmit the next Bluetooth data packet in the sequence using the selected antenna (e.g., antenna 40U). When transmission of a given sequence of Bluetooth packets has just commenced, the next Bluetooth data packet may be the first Bluetooth data packet in the sequence. Transceiver circuitry 64 may transmit the first Bluetooth data packet during a corresponding scheduled transmit period 80 (FIG. 4). Once the first Bluetooth data packet has been transmitted, transceiver circuitry 64 may wait for reception of one or more scheduled packets from external equipment 41 over the selected antenna. The one or more scheduled packets may include the Bluetooth ACK packet associated with the first Bluetooth data packet transmitted by device 10. Transceiver circuitry 64 may wait an expected amount of time (e.g., for the duration of the scheduled receive time period 82 immediately following the time period 80 during which the first Bluetooth packet was transmitted) to receive the scheduled packet(s). This example is merely illustrative and, in general, transceiver 64 may wait for reception of two or more ACK packets or other scheduled packets if desired.

If the one or more scheduled packets (e.g., the scheduled ACK packet generated by external equipment 41 in response to successfully receiving the first Bluetooth data packet transmitted by device 10) are received within the expected amount of time (e.g., during the scheduled receive period 82), processing may loop back to step 102 as shown by path 104. Transceiver 64 may subsequently transmit the second Bluetooth data packet in the sequence of Bluetooth data packets using selected antenna 40U. Transceiver 64 may continue to transmit the remaining Bluetooth data packets in the sequence using selected antenna 40U as long as the corresponding ACK packets are received in the expected (scheduled) receive time periods 82.

If the one or more scheduled packets (e.g., the ACK packet corresponding to the transmitted first Bluetooth data packet) are not received within the expected amount of time or a NACK packet is received, processing may proceed to step 108 as shown by path 106. Failure to receive the ACK packet within the scheduled period may, for example, be indicative of the selected antenna 40U being blocked or otherwise hindered from properly communicating with external equipment 41 over link 42. If transceiver 64 attempts to re-transmit the first Bluetooth data packet using the selected antenna 40U, there may be a relatively high likelihood that the re-transmitted packet will also fail to be successfully received by external equipment 41 (e.g., because it may be unlikely that antenna 40U has moved so as to become unblocked between re-transmissions of the first packet).

At step 108, transceiver circuitry 64 may select the other (e.g., secondary) antenna for transmitting Bluetooth data packets to external equipment 41 (e.g., without attempting to re-transmit the first Bluetooth data packet using the primary antenna). Bluetooth circuitry 64 may provide control signals CTRL over control path 68 to place switch 60 in a state that couples the newly selected antenna to port 52. In the example of FIG. 3, switch 60 may be controlled to couple lower antenna 40L to port 52.

At step 110, transceiver 64 may re-transmit the current (e.g., first) Bluetooth data packet using the selected secondary antenna 40L. Once the first Bluetooth data packet has been re-transmitted using secondary antenna 40L, transceiver circuitry 64 may wait for reception of the one or more scheduled packets (e.g., the ACK packet associated with the transmitted first Bluetooth data packet). Transceiver circuitry 64 may wait an expected amount of time (e.g., for the duration of the scheduled Bluetooth receive time period 82 immediately following the transmit time period 80 during which the first packet was re-transmitted) to receive the one or more scheduled packets.

If the one or more scheduled packets (e.g., the ACK packet) is received within the expected amount of time, processing may proceed to optional step 114. At optional step 114, transceiver circuitry 64 may select the other antenna (e.g., primary antenna 40U) to transmit any subsequent Bluetooth data packets in the stream. Processing may then loop back to step 102 as shown by path 116 to transmit the second Bluetooth data packet in the sequence using primary antenna 40U. Primary antenna 40U may continue to transmit the remaining Bluetooth data packets in the sequence until transceiver 64 fails to receive a scheduled ACK packet.

In another suitable arrangement, step 114 may be omitted and processing may loop back to step 102 as shown by path 116 so that secondary antenna 40L is used to transmit the second Bluetooth data packet in the stream. Secondary antenna 40L may continue to transmit the remaining Bluetooth data packets in the sequence until transceiver 64 fails to receive a scheduled ACK packet. Omitting step 114 may, for example, allow transceiver 64 to continue Bluetooth communications using the antenna that is known to have most recently performed a successful transmission to external equipment 41.

If desired, optional step 114 may be performed whenever the secondary antenna is used to re-transmit a given Bluetooth packet at step 110 and may be omitted whenever the default antenna is used to perform step 110. Such operations may, for example, be performed if external equipment 41 is statistically more likely to successfully receive the second Bluetooth data packet from the default antenna than the secondary antenna at any given time (e.g., due to the default antenna more often being oriented towards external equipment 41, having a higher maximum antenna efficiency than the secondary antenna, etc.).

If the one or more scheduled packets (e.g., the ACK packet) are not received within the expected amount of time while processing step 110, processing may proceed to step 120 as shown by path 118. At step 120, transceiver circuitry 64 may determine whether the number of re-transmit attempts performed for the current Bluetooth data packet is less than a re-transmit threshold. The re-transmit threshold may dictate the number of allowable re-transmit attempts before the packet is dropped in favor of transmitting the next Bluetooth data packet in the stream. If the number of re-transmit attempts for the current Bluetooth data packet is less than the threshold, processing may loop back to step 108 as shown by path 122 to attempt another re-transmission of the packet using the other antenna (e.g., upper antenna 40U). If the number of re-transmit attempts for the current Bluetooth data packet is greater than or equal to the threshold, processing may loop back to step 102 as shown by paths 124 and 116 or may proceed to optional step 114 as shown by path 124 (e.g., so that the next Bluetooth data packet in the stream may be transmitted by upper antenna 40U or lower antenna 40L).

By blindly and proactively switching antennas when a corresponding ACK packet is not received or a NACK packet is received, Bluetooth transceiver 64 may increase the overall probability that a given Bluetooth data packet will be successfully received by external equipment 41 relative to scenarios where only a single antenna is used to re-transmit the Bluetooth data packets. In this way, Bluetooth transceiver 64 may decrease the overall probability of packet loss over time for Bluetooth link 42 regardless of the environmental conditions (e.g., orientation) of device 10 and without using other sensor circuitry that would otherwise require an excessive amount of time to determine a desired antenna for use. Performing Bluetooth antenna diversity operations in this way may, as an example, decrease the average error rate in the Bluetooth data received at external equipment 41 by as much as 10-50% relative to scenarios in which only a single antenna is used to re-transmit each Bluetooth data packet.

Figure 7:
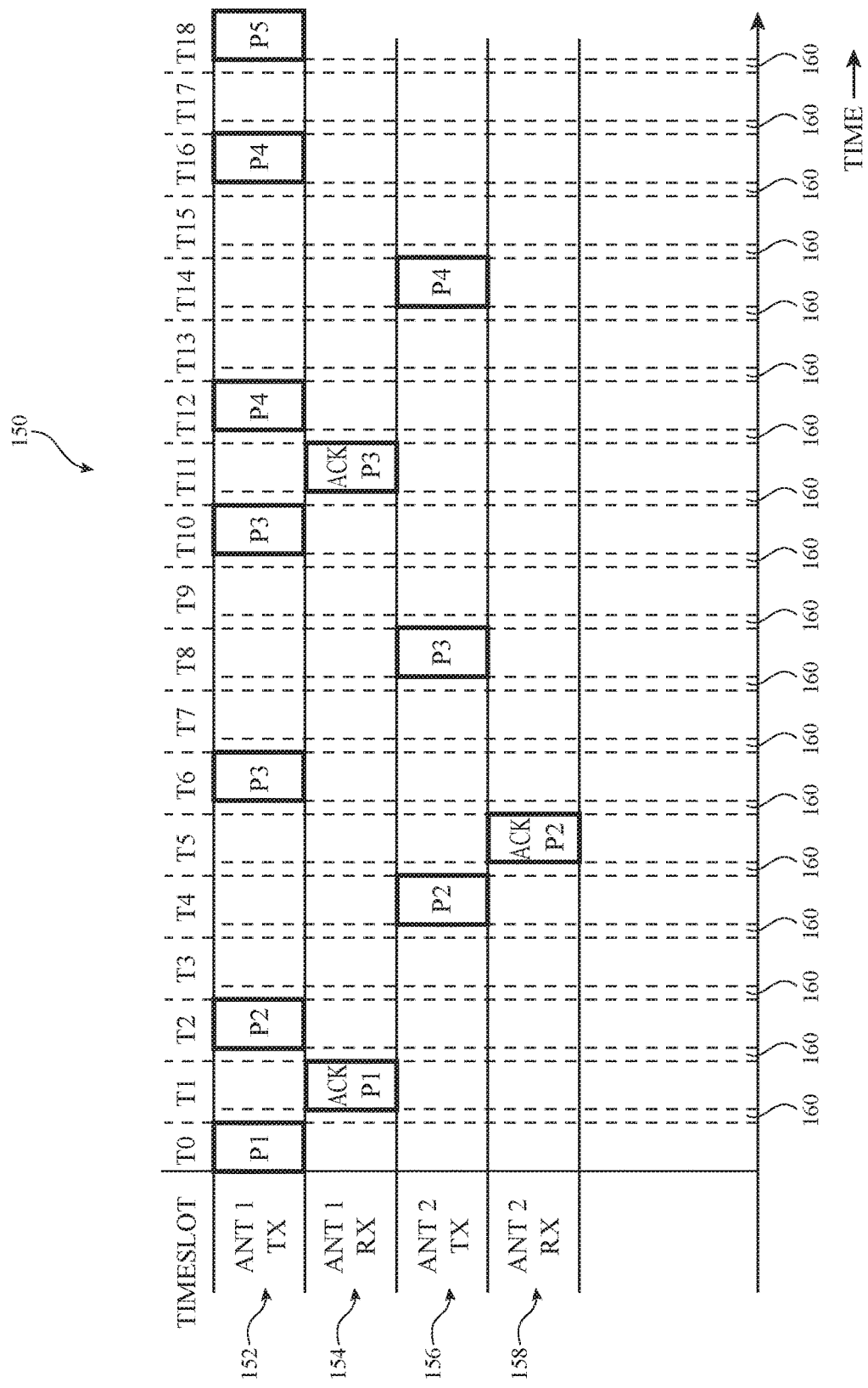

FIG. 7 shows a timing diagram 150 illustrating one example of how Bluetooth transceiver 64 may perform Bluetooth antenna diversity operations using antennas 40L and 40U for a corresponding stream of Bluetooth data packets. As shown in FIG. 7, time is plotted on the horizontal axis and is divided into a number of alternating transmit and receive time periods T (e.g., a first time period T0, a second time period T1, a third time period T2, etc.). The duration of time periods T may be dictated by the Bluetooth protocol. Each time period T may include, for example, one or more consecutive 625 µs Bluetooth protocol timeslots. Even-numbered time periods (e.g., periods T0, T2, T4, etc.) may be transmit time periods such as time periods 80 of FIG. 4, whereas odd-numbered time periods (e.g., periods T1, T3, T5, etc.) may be receive time periods such as time periods 82 of FIG. 4. Each time period T may have the same duration or two or more time periods T may have different durations. In general, the durations of each time period T may be dictated by transceiver 64 based on the specifications of the Bluetooth protocol.

Bluetooth transceiver circuitry 64 may generate a stream or sequence of Bluetooth data packets P for transmission to external equipment 41 (e.g., a sequence of audio packets formatted according to the Bluetooth protocol for playback on external audio speakers, etc.). The sequence of Bluetooth data packets may be generated for transmission in a corresponding chronological order (e.g., a first Bluetooth data packet P1, a second Bluetooth data packet P2 subsequent to first packet P1, a third Bluetooth data packet P3 subsequent to second packet P2, etc.).

As shown in FIG. 7, row 152 of timing diagram 150 illustrates radio-frequency Bluetooth data that is transmitted using a first (default) antenna ("ANT 1 TX"). Row 154 of timing diagram 150 illustrates radio-frequency Bluetooth data that is received using the first antenna ("ANT 1 RX"). For example, row 152 may illustrate Bluetooth data that is transmitted using upper antenna 40U of FIG. 3 whereas row

154 illustrates Bluetooth data that is received using upper antenna 40U. Row 156 of timing diagram 150 illustrates radio-frequency Bluetooth data that is transmitted using a secondary antenna ("ANT 2 TX"). Row 158 of timing diagram 150 illustrates radio-frequency Bluetooth data that is received using the secondary antenna ("ANT 2 RX"). For example, row 156 may illustrate Bluetooth data that is transmitted using lower antenna 40L of FIG. 3 whereas row 158 illustrates Bluetooth data that is received using lower antenna 40L.

Prior to period T0, Bluetooth transceiver 64 may control switch 60 to couple default upper antenna 40U to port 52 for transmission (e.g., while processing step 100 of FIG. 6). Bluetooth transceiver 64 may transmit the first Bluetooth data packet P1 from the sequence using upper antenna 40U during transmit period T0. Bluetooth transceiver 64 may wait for a predetermined (scheduled) amount of time (e.g., for the duration of scheduled receive time period T1) to receive an ACK packet corresponding to transmitted data packet P1 from external equipment 41 over upper antenna 40U (e.g., while processing step 102 of FIG. 6).

Each time period T may include a corresponding guard or buffer time 160 to allow time for Bluetooth transceiver 64 to perform any necessary frequency hopping or switching operations. For example, guard times 160 may allow time for transceiver circuitry 64 to perform changes in frequency for each packet. Similarly, guard times 160 may allow time for Bluetooth transceiver 64 to adjust switching circuitry 60 whenever it is desired to change the antenna that is coupled to port 52. Each guard time 160 may be on the order of 0-1 µs, as an example. Each guard time 160 may have the same duration or different guard times 160 may have different durations. The example of FIG. 7 in which guard times 160 occur at the beginning of each time period T is merely illustrative and, in general, guard times 160 may occur at the end of each time period T or at any other desired time in each time period T.

In the example of FIG. 7, upper antenna 40U receives a scheduled first ACK packet "ACK P1" from external equipment 41 during receive time period T1. This may be indicative of external equipment 41 successfully receiving packet P1 during transmit time period T0. Transceiver circuitry 64 and upper antenna 40U may subsequently transmit the second Bluetooth data packet P2 from the sequence during transmit time period T2 (e.g., while looping back to step 102 over path 104 of FIG. 6). Transceiver circuitry 64 may wait to receive a scheduled ACK packet "ACK P2" corresponding to packet P2 from external equipment 41 during receive time period T3.

In the example of FIG. 7, upper antenna 40U does not receive any ACK packets during receive time period T3. This may be indicative of an external object blocking upper antenna 40U, changes in orientation of upper antenna 40U with respect to external equipment 41, or other antenna performance deteriorations. Because the scheduled ACK packet is not received during the expected amount of time (e.g., because ACK P2 is not received during the scheduled receive time period T3), transceiver circuitry 64 may subsequently adjust switch 60 to couple lower antenna 40L to port 52 (e.g., while processing step 108 of FIG. 6). Transceiver circuitry 64 may subsequently re-transmit second packet P2 using lower antenna 40L during transmit time period T4 and wait to receive scheduled ACK packet ACK P2 from external equipment 41 during receive time period T5. In the example of FIG. 7, lower antenna 40L receives scheduled ACK packet ACK P2 from external equipment 41 during receive time period T5. This may be indicative of external equipment 41 successfully receiving packet P2 during time period T4 (e.g., because lower antenna 40L is not blocked by external objects and is able to successfully communicate with external equipment 41).

In one suitable arrangement, optional step 114 of FIG. 6 may be performed whenever the secondary antenna is used to re-transmit a given Bluetooth packet while performing step 110 of FIG. 6 (e.g., optional step 114 may be omitted whenever the default antenna is used to perform step 110). In the example of FIG. 7, lower antenna 40L is the secondary antenna so transceiver circuitry 64 subsequently switches the default antenna (e.g., upper antenna 40U) back into use (e.g., by adjusting switch 60 to couple antenna 40U to port 52). Transceiver circuitry 64 may then transmit the third Bluetooth data packet P3 using selected upper antenna 40U during scheduled transmit time period T6 (e.g., while processing step 102 after looping back through path 116 from step 114 of FIG. 6). This example is merely illustrative. If desired, transceiver 64 may perform or omit optional step 114 every time processing loops back to step 102 via path 116 of FIG. 6 for a given sequence of Bluetooth data packets. In another suitable arrangement, transceiver 64 may perform step 114 of FIG. 6 for any desired first subset of Bluetooth data packets and may omit step 114 for any desired second subset of Bluetooth data packets from a given sequence of Bluetooth data packets.

Transceiver circuitry 64 may wait for the duration of receive time period T7 to receive scheduled ACK packet "ACK P3" corresponding to packet P3 from external equipment 41. In the example of FIG. 7, upper antenna 40U does not receive any ACK packets during receive time period T7. Because the scheduled ACK packet is not received in the expected amount of time (e.g., because scheduled ACK packet ACK P3 is not received during receive time period T7), transceiver circuitry 64 may subsequently adjust switch 60 to couple lower antenna 40L to port 52 (e.g., while processing step 108 of FIG. 6). Transceiver circuitry 64 may then re-transmit third packet P3 using lower antenna 40L during transmit time period T8 and wait to receive scheduled ACK packet ACK P3 during receive time period T9 (e.g., while processing step 110 of FIG. 6).

In the example of FIG. 7, lower antenna 40L does not receive any ACK packets during receive time period T9. Because the expected ACK packet is not received in scheduled receive time period T9, transceiver circuitry 64 may proceed to determine whether the threshold number of re-transmit attempts for packet P3 has been exceeded (e.g., while processing step 120 of FIG. 6). In this example, the threshold is three or greater and transceiver 64 subsequently switches upper antenna 40U back into use (e.g., while processing steps 120 and 108 after looping back over path 122 of FIG. 6). Transceiver 64 may re-transmit third packet P3 using upper antenna 40U during transmit time period T10 and may wait to receive scheduled ACK packet ACK P3 using upper antenna 40U during the corresponding receive time period T11 (e.g., while processing step 110 after looping back to step 108 over path 122 of FIG. 6).

In the example of FIG. 7, transceiver circuitry 64 receives the expected ACK packet ACK P3 during receive period T11 using upper antenna 40U. Because upper antenna 40U is the default antenna in this scenario, transceiver 64 of FIG. 7 omits optional step 114 of FIG. 6 and transmits the next (fourth) Bluetooth data packet P4 in the sequence using upper antenna 40U during transmit time period T12 (e.g., while looping back to step 102 over path 116 and omitting step 114 of FIG. 6). In another suitable arrangement, transceiver 64 may perform optional step 114 of FIG. 6 so that lower antenna 40L transmits packet P4.

Transceiver circuitry 64 may wait to receive a scheduled ACK packet "ACK P4" from external equipment 41 over antenna 40U during the subsequent receive time period T13. Because no ACK packets are received by antenna 40U during receive time period T13, transceiver circuitry 64 may control switch 60 to couple lower antenna 40L to port 52 (e.g., while processing step 108 of FIG. 6). Transceiver 64 may re-transmit fourth packet P4 during transmit time period T14 and may wait to receive scheduled ACK packet ACK P4 during receive time period T15 (e.g., while processing step 110 of FIG. 6). Because the scheduled ACK packet is not received in receive time period T15, transceiver circuitry 64 may proceed to determine whether the threshold number of re-transmit attempts for packet P4 has been exceeded (e.g., while processing step 120 of FIG. 6). The threshold may be the same as or different from the threshold used when processing packet P3. For the sake of illustrating the different possible steps of FIG. 6, in the example of FIG. 7, the threshold for packet P4 is two re-transmits. Because packet P4 has only been re-transmitted once (which is less than the re-transmit threshold of two), transceiver circuitry 64 may control switch 60 to couple upper antenna 40U to port 52 (e.g., while looping back to step 108 over path 122).

Transceiver circuitry 64 may re-transmit fourth packet P4 over upper antenna 40U during transmit time period T16 and may wait to receive scheduled ACK packet ACK P4 over antenna 40U during subsequent receive time period T17. Because scheduled ACK packet ACK P4 is not received over antenna 40U during receive time period T17, transceiver 64 may compare the number of re-transmits for packet P4 to the re-transmit threshold. Because the re-transmit threshold for packet P4 is two in this example, transceiver 64 may move on to the next (fifth) Bluetooth data packet P5 in the stream and may control upper antenna 40U to transmit the fifth Bluetooth data packet P5 during transmit time period T18 (e.g., while looping back to step 102 via paths 124 and 116 and omitting optional step 114 of FIG. 6). In scenarios were optional step 114 is performed, lower antenna 40L may be controlled to transmit packet P5.

In this way. Bluetooth transceiver 64 may utilize the scheduling of the Bluetooth protocol in addition to information about whether or not expected packets (e.g., scheduled ACK packets) are received in performing Bluetooth antenna diversity operations. In other words, transceiver 64 may determine whether a scheduled ACK packet has been received within a predetermined receive time period and may use that determination in deciding when to switch antennas. Such operations may be performed without input from other sensor circuitry that would otherwise identify the presence of environmental factors affecting antenna performance. This may, for example, reduce the amount of time and processing resources required to select which antenna to use for Bluetooth link 42 relative to scenarios where other sensor circuitry is used to select the antennas. In addition, these operations may be performed without transmitting the same Bluetooth data packet during two consecutive transmit time periods 80, which may optimize the likelihood of successful reception of the Bluetooth data packets at external equipment 41. This may, for example, allow for Bluetooth transceiver 64 to achieve improved data accuracy (e.g., reduced error rates) relative to scenarios in which a single antenna is used to perform Bluetooth communications.

The example of FIG. 7 is merely illustrative of how Bluetooth data packets from a sequence of Bluetooth data may be transmitted and received by two different antennas while performing the Bluetooth diversity operations of FIG. 6. The performance of wireless communications circuitry 34 may vary in practice. For example, transceiver 64 may wait to receive more than one ACK packet or other scheduled packets during the odd numbered periods T. In the example of FIG. 7, each packet P and each ACK packet is shown as being conveyed over antennas 40 for the entirety of the corresponding time period T (minus buffer periods 160). This is merely illustrative and, in practice, each packet P and each ACK packet may be conveyed over antennas 40 for a subset of the corresponding time period T (excluding buffer periods 160). In general, other time periods may be interposed among the time periods T shown in FIG. 7, more than two antennas may be used, WLAN signals may be multiplexed onto antenna 40L and/or antenna 40U, each period may involve the transmission or reception of more than one data packet, etc. The examples above describe antenna diversity operations that are performed using the Bluetooth protocol. In general, similar antenna selection and diversity operations may be performed for communications using any desired short range or long range communications protocols.

The operations of devices 10 (e.g., the operations of FIG. 6) may be performed by control circuitry 28, applications processor 44, and/or control circuitry on module 36. During operation, this control circuitry (which may sometimes be referred to as processing circuitry, processing and storage, computing equipment, a computer, etc.) may be configured to perform the methods of FIG. 6 and/or other operations (e.g., using dedicated hardware and/or using software code running on hardware such as control circuitry 28 and/or control circuitry on module 36). Software code for performing these operations may be stored on non-transitory (tangible) computer readable storage media. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media. Software stored on the non-transitory computer readable storage media may be executed on the processing circuitry of control circuitry 16 and/or 18. The processing circuitry may include application-specific integrated circuits with processing circuitry, one or more microprocessors, or other processing circuitry.

The foregoing is merely illustrative and various modifications can be made by those skilled in the art without departing from the scope and spirit of the described embodiments. The foregoing embodiments may be implemented individually or in any combination.

What is claimed is:

1. A method of operating an electronic device having a Wireless Personal Area Network (WPAN) transceiver, control circuitry, and first and second antennas, the method comprising:
   with the WPAN transceiver, transmitting a first WPAN packet from a sequence of WPAN packets over the first antenna;
   with the control circuitry, determining whether the WPAN transceiver has received a second WPAN packet over the first antenna during a predetermined time period following transmission of the first WPAN packet; and
   with the WPAN transceiver, in response to determining that the WPAN transceiver has failed to receive the second WPAN packet during the predetermined time period, transmitting the first WPAN packet over the second antenna.

2. The method defined in claim 1, wherein the sequence of WPAN packets comprises a third WPAN packet subsequent to the first WPAN packet in the sequence, the method further comprising:
with the WPAN transceiver, in response to determining that the WPAN transceiver has received the second WPAN packet during the predetermined time period, transmitting the third WPAN packet over the first antenna.

3. The method defined in claim 2, wherein the WPAN transceiver comprises a Bluetooth transceiver, the first WPAN packet comprises a first Bluetooth data packet, the third WPAN packet comprises a third Bluetooth data packet, and the second WPAN packet comprises an acknowledge (ACK) packet generated by an external device in response to receiving the first Bluetooth data packet transmitted by the first antenna.

4. The method defined in claim 1, further comprising:
with the control circuitry, subsequent to transmitting the first WPAN packet over the second antenna, determining whether the WPAN transceiver has received the second WPAN packet over the second antenna during an additional predetermined time period following transmission of the first WPAN packet over the second antenna.

5. The method defined in claim 4 wherein the sequence of WPAN packets comprises a third WPAN packet subsequent to the first WPAN data packet in the sequence, the method further comprising:
with the WPAN transceiver, in response to determining that the WPAN transceiver has received the second WPAN packet during the additional predetermined time period, transmitting the third WPAN packet over the second antenna.

6. The method defined in claim 4, wherein the sequence of WPAN packets comprises a third WPAN packet subsequent to the first WPAN packet in the sequence, the method further comprising:
with the WPAN transceiver, in response to determining that the WPAN transceiver has received the second WPAN packet during the additional predetermined time period, transmitting the third WPAN packet over the first antenna.

7. The method defined in claim 4, wherein the sequence of WPAN packets comprises a third WPAN packet subsequent to the first WPAN packet in the sequence, the method further comprising:
with the control circuitry, in response to determining that the WPAN transceiver has failed to receive the second WPAN packet during the additional time period, comparing a number of re-transmission attempts for the first WPAN packet to a threshold value;
with the WPAN transceiver, in response to determining that the number of re-transmission attempts is less than the threshold value, re-transmitting the first WPAN packet using the first antenna; and
with the WPAN transceiver, in response to determining that the number of re-transmission attempts is greater than or equal to the threshold value, transmitting the third WPAN data packet using a selected one of the first and second antennas.

8. The method defined in claim 1, wherein the WPAN transceiver comprises a Bluetooth transceiver, transmitting the first WPAN packet over the first antenna comprises transmitting a first Bluetooth data packet over the first antenna during a first set of consecutive Bluetooth protocol timeslots, and the predetermined time period comprises a second set of consecutive Bluetooth protocol timeslots subsequent to the first set of consecutive Bluetooth protocol timeslots.

9. An electronic device, comprising:
first and second antennas;
Wireless Personal Area Network (WPAN) transceiver circuitry;
a switch having a first switch port coupled to the first antenna, a second switch port coupled to the second antenna, and a third switch port coupled to the WPAN transceiver circuitry, wherein the WPAN transceiver circuitry is configured to transmit a WPAN data packet over the second antenna while the second switch port is shorted to the third switch port; and
control circuitry, wherein the control circuitry is configured to control the switch to short the first switch port to the third switch port and the WPAN transceiver circuitry is configured to re-transmit the WPAN data packet over the first antenna in response to reception of a non-acknowledge (NACK) packet corresponding to the WPAN data packet over the second antenna while the second switch port is shorted to the third switch port.

10. The electronic device defined in claim 9, further comprising:
Wireless Local Area Network (WLAN) transceiver circuitry, wherein the WLAN transceiver circuitry is configured to transmit WLAN signals over the first and second antennas.

11. The electronic device defined in claim 10, wherein the WLAN transceiver circuitry comprises a first WLAN transceiver that is configured to transmit the WLAN signals over the first antenna and a second WLAN transceiver that is configured to transmit the WLAN signals over the second antenna, the electronic device further comprising:
an additional switch having a fourth switch port coupled to the second WLAN transceiver, a fifth switch port coupled to the WPAN transceiver, and a sixth switch port coupled to third switch port of the switch.

12. The electronic device defined in claim 11, wherein the control circuitry is configured to control the switch to short the second switch port to the third switch port and is configured to control the additional switch to short the fourth switch port to the sixth switch port while the second WLAN transceiver transmits the WLAN signals over the second antenna.

13. The electronic device defined in claim 12, wherein the WPAN transceiver circuitry comprises a Bluetooth transceiver and the WPAN data packet comprises a Bluetooth data packet.

14. The electronic device defined in claim 13, wherein the first WLAN transceiver, the second WLAN transceiver, the Bluetooth transceiver, and the additional switch are formed on a shared integrated circuit having first and second ports, the first port couples the first WLAN transceiver to the first antenna, and the second port couples the additional switch to the second antenna through the switch.

15. The electronic device defined in claim 13, further comprising:
a conductive electronic device housing having opposing first and second ends;
an ear speaker at the first end; and a microphone at the second end, wherein the first antenna is formed at the first end and the second antenna is formed at the second end.

16. A method of operating an electronic device having a Bluetooth transceiver and first and second antennas coupled to the Bluetooth transceiver, the method comprising:
- with the Bluetooth transceiver, transmitting a first Bluetooth data packet from a sequence of Bluetooth data packets over the first antenna during a first transmit period;
- with the Bluetooth transceiver, in response to reception of an acknowledge (ACK) packet corresponding to the first Bluetooth data packet over the first antenna during a first receive period, transmitting a second Bluetooth data packet from the sequence over the first antenna during a second transmit period, wherein the first receive period is subsequent to the first transmit period and the second transmit period is subsequent to the first receive period; and
- with the Bluetooth transceiver, in response to failing to receive the ACK packet over the first antenna during the first receive period, transmitting the first Bluetooth data packet over the second antenna during the second transmit period.

17. The method defined in claim 16, further comprising:
- with the Bluetooth transceiver, in response to reception of the ACK packet over the second antenna during a second receive period subsequent to the second transmit period, transmitting the second Bluetooth data packet over a selected one of the first and second antennas during a third transmit period subsequent to the second receive period; and
- with the Bluetooth transceiver, in response to reception of an additional ACK packet corresponding to the second Bluetooth data packet over the selected one of the first and second antennas during a third receive period, transmitting a third Bluetooth data packet from the sequence of Bluetooth data packets over the selected one of the first and second antennas during a fourth transmit period subsequent to the third receive period, wherein the third receive period is subsequent to the third transmit period.

18. The method defined in claim 17, further comprising:
- with the Bluetooth transceiver, in response to failing to receive the ACK packet over the second antenna during the second receive period, transmitting the third Bluetooth data packet during the third transmit period.

19. The method defined in claim 17, further comprising:
- with the Bluetooth transceiver, in response to failing to receive the ACK packet over the second antenna during the second receive period, re-transmitting the second Bluetooth data packet using the first antenna during the third transmit period and waiting for reception of the additional ACK packet by the first antenna during the third receive period.

20. The method defined in claim 16, wherein the electronic device further comprises Wireless Local Area Network (WLAN) transceiver circuitry and switching circuitry, the method further comprising:
- with the WLAN transceiver circuitry, transmitting WLAN signals over the first and second antennas during a set of time periods that are different from the first and second transmit periods and the first receive period; and
- with the switching circuitry, decoupling the Bluetooth transceiver from the first and second antennas during the set of time periods.

* * * * *